United States Patent
Yu et al.

(10) Patent No.: US 12,260,730 B2
(45) Date of Patent: Mar. 25, 2025

(54) VISUALIZATION MONITORING GLASSES

(71) Applicant: ZHEJIANG UNIVERSITY, Hangzhou (CN)

(72) Inventors: Hong Yu, Hangzhou (CN); Xin Yu, Hangzhou (CN); Hongyuan Lv, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 142 days.

(21) Appl. No.: 18/147,846

(22) Filed: Dec. 29, 2022

(65) Prior Publication Data
US 2023/0326320 A1    Oct. 12, 2023

(30) Foreign Application Priority Data
Mar. 22, 2022  (CN) .......................... 202210284673.9

(51) Int. Cl.
  *G08B 21/04*  (2006.01)
  *G02B 27/00*  (2006.01)
  *G02B 27/01*  (2006.01)
  *G06F 3/01*  (2006.01)

(52) U.S. Cl.
  CPC ..... *G08B 21/0453* (2013.01); *G02B 27/0093* (2013.01); *G02B 27/017* (2013.01); *G06F 3/013* (2013.01); *G06F 3/017* (2013.01); *G02B 2027/014* (2013.01)

(58) Field of Classification Search
  CPC ............. G08B 21/0453; G02B 27/009; A61B 5/6803; G02C 5/001
  See application file for complete search history.

(56) References Cited

U.S. PATENT DOCUMENTS

| | | | | |
|---|---|---|---|---|
| 10,127,731 | B1 * | 11/2018 | Ozery | G08B 25/08 |
| 2007/0030442 | A1 * | 2/2007 | Howell | G02C 5/143 |
| | | | | 351/158 |
| 2017/0054900 | A1 * | 2/2017 | Chien | H04N 23/61 |
| 2022/0178743 | A1 * | 6/2022 | Howell | G01J 1/0238 |

FOREIGN PATENT DOCUMENTS

GB    2571118 A  *  8/2019  ........... A61B 5/6803

* cited by examiner

*Primary Examiner* — Mirza F Alam
(74) *Attorney, Agent, or Firm* — Much Shelist, PC; Adam K Sacharoff, Esq.

(57) ABSTRACT

Disclosed is a pair of visualization monitoring glasses, comprising a monocular. The monocular comprises a lens and a temple. The temple is internally provided with a chip, an optical display system, an interactive system, and an early warning system. The chip is configured to receive a monitoring signal, form a display signal according to the monitoring signal, and send the display signal out. The optical display system is configured to receive the display signal and display the display content through the lens. The interactive system is configured to acquire a gesture action and control the optical display system to switch different display content according to the gesture action. The early warning system is configured to acquire the monitoring signal, perform safety analysis according to the monitoring content, and control the optical display system to perform safety feedback.

10 Claims, 5 Drawing Sheets

VISUALIZATION MONITORING GLASSES

CROSS-REFERENCE TO RELATED APPLICATION

This patent application claims the benefit and priority of Chinese Patent Application No. 202210284673.9, filed with the China National Intellectual Property Administration on Mar. 22, 2022, the disclosure of which is incorporated by reference herein in its entirety as part of the present application.

TECHNICAL FIELD

The present disclosure relates to the field of medical devices, and in particular relates to a pair of visualization monitoring glasses.

BACKGROUND

With the rapid development of current medical technologies, for the increase in life expectancy, the number of surgical patients and critically ill patients has increased significantly, but the number of anesthesiologists and physicians in intensive care unit (ICU) is still seriously insufficient, causing the extremely high workload and work intensity of anesthesiologists and ICU physicians, which damages the physical and mental health of these doctors and also reduces the safety guarantee for patients. How to make the achievements of modern science and technology participate in anesthesia and intensive care management to reduce the workload of the doctors while guaranteeing the medical safety is an urgent problem to be solved at present.

Take the work of anesthesiologists as an example, during the operation, the anesthesiologists must rely on a variety of complicated and sophisticated instruments to monitor life indicators of the patient during the operation and the anesthesia recovery period, including respiratory rate, heart rate, blood pressure, oxygen saturation, ECG, EEG, cardiac output, blood loss and other information, thus making corresponding judgments and treatments in time to ensure the life safety of the patient and escort the operation. At present, the shortage of anesthesiologists is very obvious. Anesthesiologists are divided into junior physicians and senior physicians, one junior physician is responsible for anesthesia in a corresponding operating room, while the senior physician is required to supervise multiple operating rooms, manage patients together with the junior physicians, replace with the junior physicians when they have a meal or go to the toilet, control anesthesia quality, and give instructions for emergency situations. However, as the junior physicians lack clinical experience and continuous work leads to increased fatigue, the senior anesthesiologists are required to strictly control and participate in patient management. Especially, the rescue in surgical anesthesia is a work that counts every second. It is of a clinical practical significance to enable the senior anesthesiologists to obtain the information of patient from time to time within the visual range and to get a prompt about the safety warning of the patient. Although anesthesia robots have appeared on the market at present, they are still in the stage of assisting anesthesiologists, lacking the ability to assist anesthesiologists in coordinating all types of information.

AR glasses are a novel type of glasses for augmented reality applications, which may provide users with virtual information by means of images, videos, 3D models and other techniques on the basis of displaying real scenes, thus skillfully integrating the virtual information with the real world. The AR glasses can be configured for displaying, photographing, e-mails processing, games and entertainment, etc. However, there are no anesthesia visualization monitoring glasses that combine such glasses with the medical industry.

SUMMARY

To this end, the present disclosure provides a pair of visualization monitoring glasses. The monitorability of the operation with anesthesia can be achieved, and the physician can grasp the change of life information at any time divorced from a monitor and make timely treatment.

The present disclosure provides a pair of visualization monitoring glasses. The visualization monitoring glasses comprise a monocular. The monocular comprises a lens and a temple. The temple is internally provided with a chip, configured to receive a monitoring signal, form a display signal according to the monitoring signal, and send the display signal out; an optical display system, configured to receive the display signal, and display the display content through the lens; an interactive system, configured to acquire a gesture action, and control the optical display system to switch different display content according to the gesture action; and an early warning system, configured to acquire the monitoring signal, perform safety analysis according to the monitoring content, and control the optical display system to perform safety feedback.

Further, the temple is internally provided with a camera, configured to acquire a viewed image, form an image signal according to the viewed image, and send the image signal out; and the chip, configured to receive the image signal, form a display signal according to the image signal, and send the display signal out.

Further, the glasses further comprise a pair of binocular glasses, and the monocular is installed on a frame on one side of the binocular glasses by a magnetic attraction device.

Further, the optical display system comprises a display screen and an optical engine. The display screen is configured to provide bright and clear display content according to the display signal, and the optical engine is configured to increase light energy utilization rate and improve light projection effect.

Further, the interactive system comprises a gesture storage module, configured to store preset gesture actions and the types of display content corresponding to different gesture actions; a gesture acquisition module, configured to acquire a gesture action, and send the acquired gesture action out; a preprocessing module, configured to receive the acquired gesture action, and preprocess the acquired gesture action to form a digital signal; a deep learning module, configured to receive the digital signal, analyze the digital signal to establish a gesture action, and compare the established gesture action with the preset gesture action; and an interactive central processing module, configured to receive the established gesture action, form an interactive instruction according to the established gesture action, and send the interactive instruction to the optical display system for interactive feedback.

Further, the early warning system comprises: a room monitoring interface, configured to acquire a monitoring signal; a monitoring trigger module, configured to store preset safety threshold values of vital sign data, and send an early warning signal outwards when the vital sign data acquired by the room monitoring interface exceed the safety threshold values; an AI (artificial intelligence) learning module, configured to store big data and receive the early warning signal, and analyze the early warning signal according to the big data to determine unsafe reasons; an early warning central processing module, configured to receive the early warning signal and unsafe reasons, form an early warning instruction, and control the optical display system to perform safety feedback; and an audio playing module, configured to receive the early warning signal and the unsafe reasons, and broadcast.

Further, the temple is further internally provided with a Bluetooth transmission system, and the Bluetooth transmission system is configured to transmit a monitoring signal in a monitor to the chip.

Further, the temple is further internally provided with a power supply system. The temple is provided with a USB interface, and the power supply system is connected to a power source by the USB interface so as to charge the temple.

Further, the temple further comprises an eyeball tracking system, which is configured to capture a movement signal, a position signal and a pupil size signal of the eyeball, and analyze a fixation point of the eyeball through the deep learning module so as to form an interactive model.

Further, the interactive central processing module is configured to receive the interactive model, form an interactive instruction, and send the interactive instruction the optical display system for interactive feedback.

Further, the lens is of a grating structure with continuous gradual change in depth, and sapphire glass is attached to the inside and outside of the lens.

Compared with the prior art, the present disclosure has the following beneficial technical effects:

According to the visualization monitoring glasses provided by the present disclosure, the AR glasses technology is integrated to achieve the monitorability of anesthesia, it is beneficial for the anesthesiologists to monitor the life data of surgical patients in real time and comprehensively master and accurately determine the patient condition when an emergency occurs, thus the anesthesia work efficiency is improved, and the life safety of the patient is further guaranteed. The glasses are provided with an alarm system which can detect the problems in time and find out the causes of the problems through the analysis of the computer, thus saving the time for life saving. The glasses are light and portable, capable of achieving the observation of the surrounding real environment and the life data at the same time, and is convenient for the anesthesiologists to monitor life data without affecting their normal activities.

Figure 1:
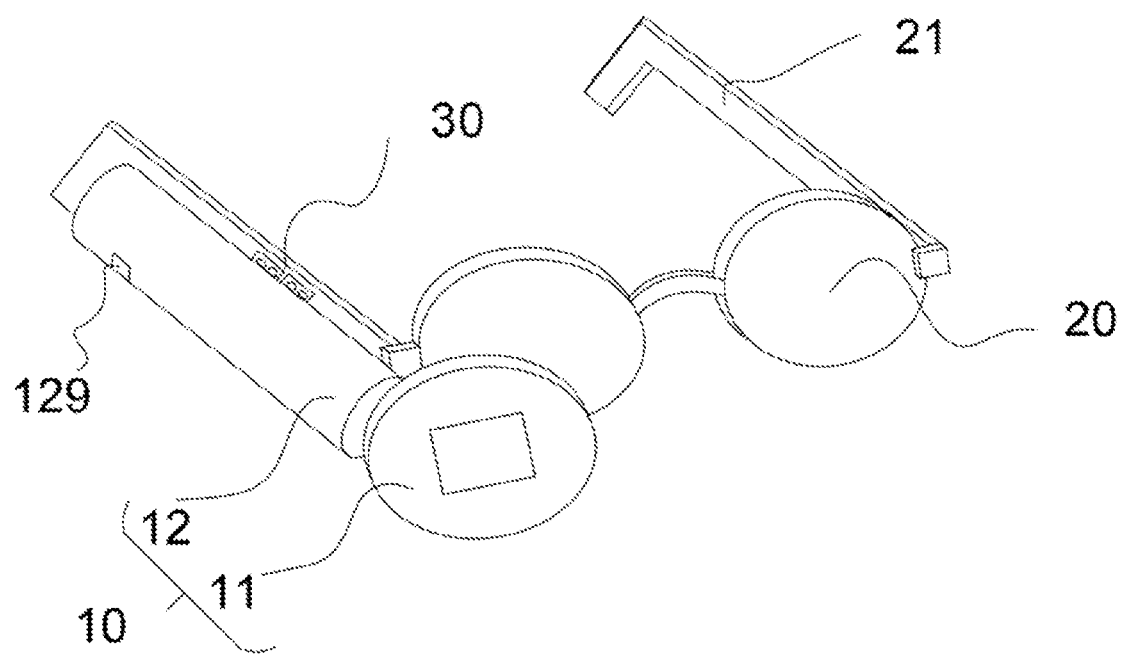
FIG. 1 is a structure diagram of a pair of visualization monitoring glasses in accordance with the present disclosure.

In the drawings: 10—monocular; 11—lens; 12—temple; 121—camera; 122—optical display system; 1221—display screen; 1222—optical engine; 123—chip; 124—Bluetooth transmission system; 125—interactive system; 126—early warning system; 127—power supply system; 129—USB interface; 20—binocular glasses; 21—frame; 30—magnetic attraction device.

DETAILED DESCRIPTION OF THE EMBODIMENTS

The specific embodiments of the present disclosure are further described in detail below with reference to the accompanying drawings and embodiments. The following embodiments are configured to illustrate the present disclosure rather than limiting the scope of the present disclosure.

In the description of the present disclosure, it needs to be noted that orientation or positional relationship indicated in the description is based on the orientation or positional relationship shown in the drawings only for convenience of description of the present disclosure and simplification of description rather than indicating or implying that the device or element referred to must have a particular orientation, be constructed and operate in a particular orientation, and thus are not to be construed as limiting the present disclosure.

Please referring to FIG. 1, the present disclosure provides a pair of visualization monitoring glasses. The visualization monitoring glasses comprise a monocular 10 and a pair of binocular glasses 20. Each of the monocular 10 and the binocular glasses 20 is provided with a magnetic attraction device 30. The monocular 10 is attached to a frame 21 on one side of the binocular glasses 20 by the magnetic attraction devices 30, and is generally installed on the frame 21 on the right side of the binocular glasses 20 in consideration of the user's usage habits. The binocular glasses 21 are made of an alloy material, and may be plain glasses or refractive correction glasses. The monocular 10 is an intelligent monocular which is matched with the binocular glasses 20, thus achieving the monitorability function during the operation and the human-glasses interaction function.

Figure 2:
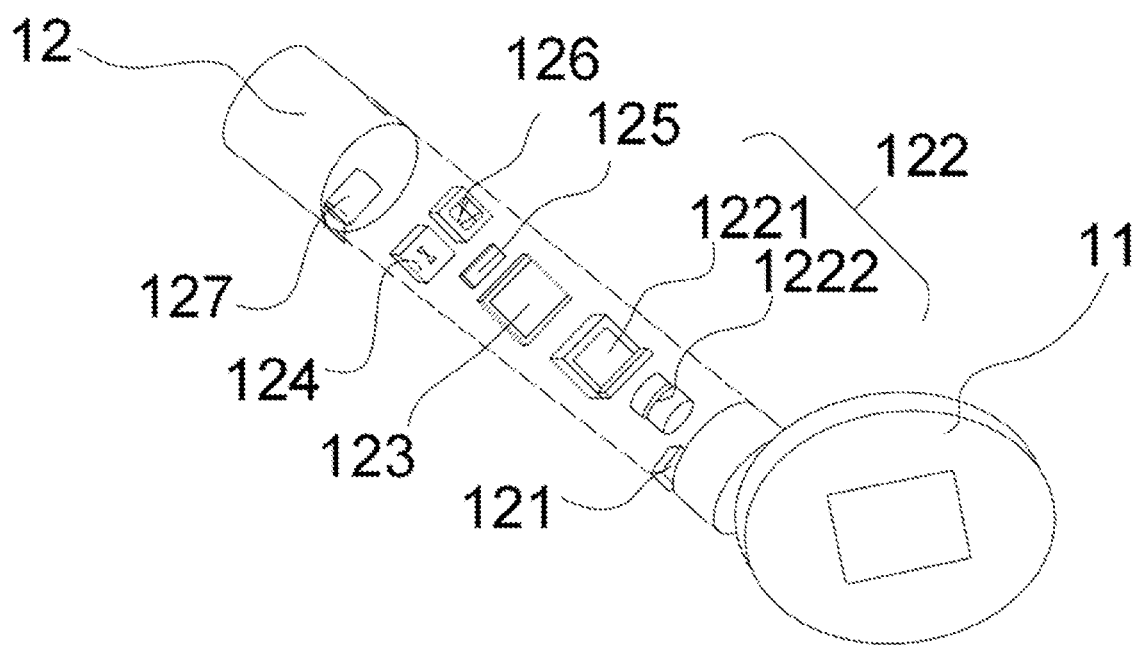
FIG. 2 is an exploded view of a structure of a monocular in accordance with the present disclosure.

In conjunction with FIG. 2, the monocular 10 comprises a lens 11 and a temple 12. The lens 11 is located at the front end of the temple 12. The temple 12 is internally provided with a camera 121, an optical display system 122, a chip 123, a Bluetooth transmission system 124, an interactive system 125, an early warning system 126, a power supply system 127, and an eyeball tracking system. The temple 12 is externally provided with a USB interface 129.

The power supply system 127 is a micro battery, which may be connected to an external power source by the USB interface 129 so as to power the temple 12.

Further, the camera 121 is located at the position in direct front of the interior of the temple 12, and is responsible for image acquisition based on SLAM (Visual Tracking and Positioning) to acquire an image viewed by the right eye of the user, and perform three-dimensional reconstruction on the acquired image based on the code preset in the camera 121 to form an image signal with AR/VR effect, and transmit the image signal to the chip 123.

Further, the Bluetooth transmission system 124 is connected to a monitor, and capable of transmitting a monitoring signal (the monitoring signal here comprises vital sign data, video monitoring data in an operating room, and the like) in the monitor to the chip 123.

Further, the chip 123 is a processing system to process the images, data and videos, and is configured to receive the image signal and the monitoring signal, process the image signal and the monitoring signal into a display signal, and send the display signal out.

Further, the optical display system 122 is configured to receive the display signal and display the display content according to the display signal. The optical display system 122 comprises a display screen 1221 and an optical engine 1222. The display screen 1221 is a miniature LED display screen, and is configured to provide bright and clear display content according to the display signal, including vital sign data, monitoring content in the operating room, images with the AR/VR effects, and the like. The optical engine 1222 is a miniature optical engine and is made of CNC integrally formed metal, in which five high-transparency glass lenses are integrated to increase the light energy utilization rate and improve the light projection effect.

Further, the lens 11 is a waveguide lens, which employs a grating structure with continuous gradual change in depth, receives the display content provided by the optical display system 122, and employs the principle of total reflection technology to transmit the display content forwards into the human eye in a form of total reflection of light waves in the waveguide. At the same time, high-strength sapphire glass is attached to the inside and outside of the lens 11, thus the lens in a sandwich structure is prevented from being scratched by hard objects and being broken when falling from the high position.

Figure 3:
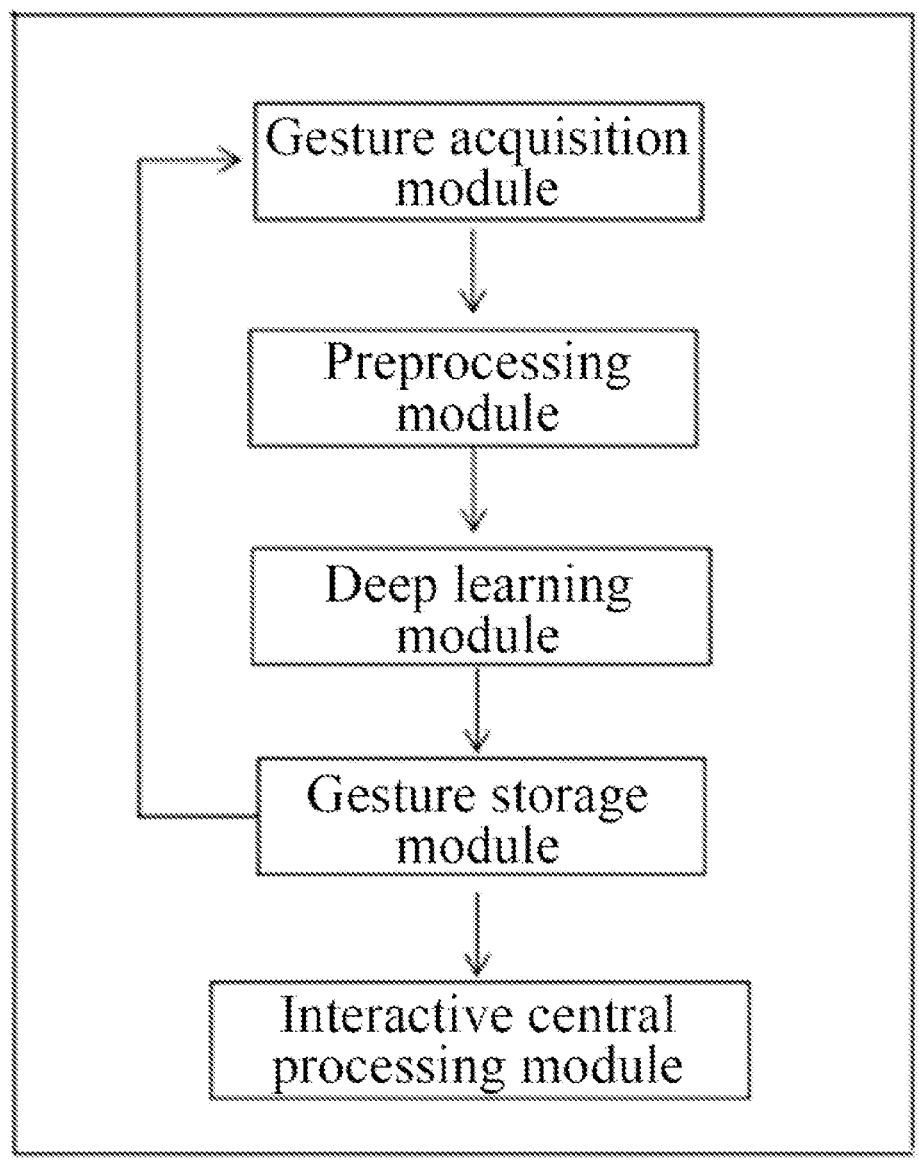
FIG. 3 is a work flow diagram of an interactive system in accordance with the present disclosure.

Please referring to FIG. 3, an interactive system 125 is configured to acquire a gesture signal and control the optical display system 122 to switch different display content according to the gesture signal. The interactive system 125 comprises a gesture trigger module, a gesture acquisition module, a preprocessing module, a deep learning module, and an interactive central processing module.

Further, the gesture storage module is configured to store preset gesture actions and types of display content corresponding to different gesture actions, for example, a screen click gesture is configured to turn on or off the display of the monitoring data, the swipe-left and swipe-right gestures are configured to display the data of different vital signs, and the scroll-up and scroll-down gestures are configured to display monitoring videos in different operating rooms. The present disclosure comprises, but is not limited to, the above gestures, and may employ combination of gestures. The gesture acquisitions module is specifically camera, which is configured to acquire a gesture action and send the acquired gesture action out. The pre-processing module is configured to receive the acquired gesture action, and form digital signals based on the information of the acquired gesture action such as bone points, spatial displacement, finger bending degree and the like. The deep learning module is configured to receive these digital signals, establish the gesture action according to these digital signals, compare the established gesture action with the preset gesture action, and accurately determine whether the input gesture action coincides with the preset gesture action or not, wherein if the input gesture action coincides with the preset gesture action, the established gesture action is sent out, and if the input gesture action does not coincide with the preset gesture action, the established gesture action is not sent out, and the gesture action needs to be re-acquired. The interactive central processing module is configured to receive the established gesture action, form an interactive instruction, and send the interactive instruction to the optical display system 122 for interactive feedback.

Figure 4:
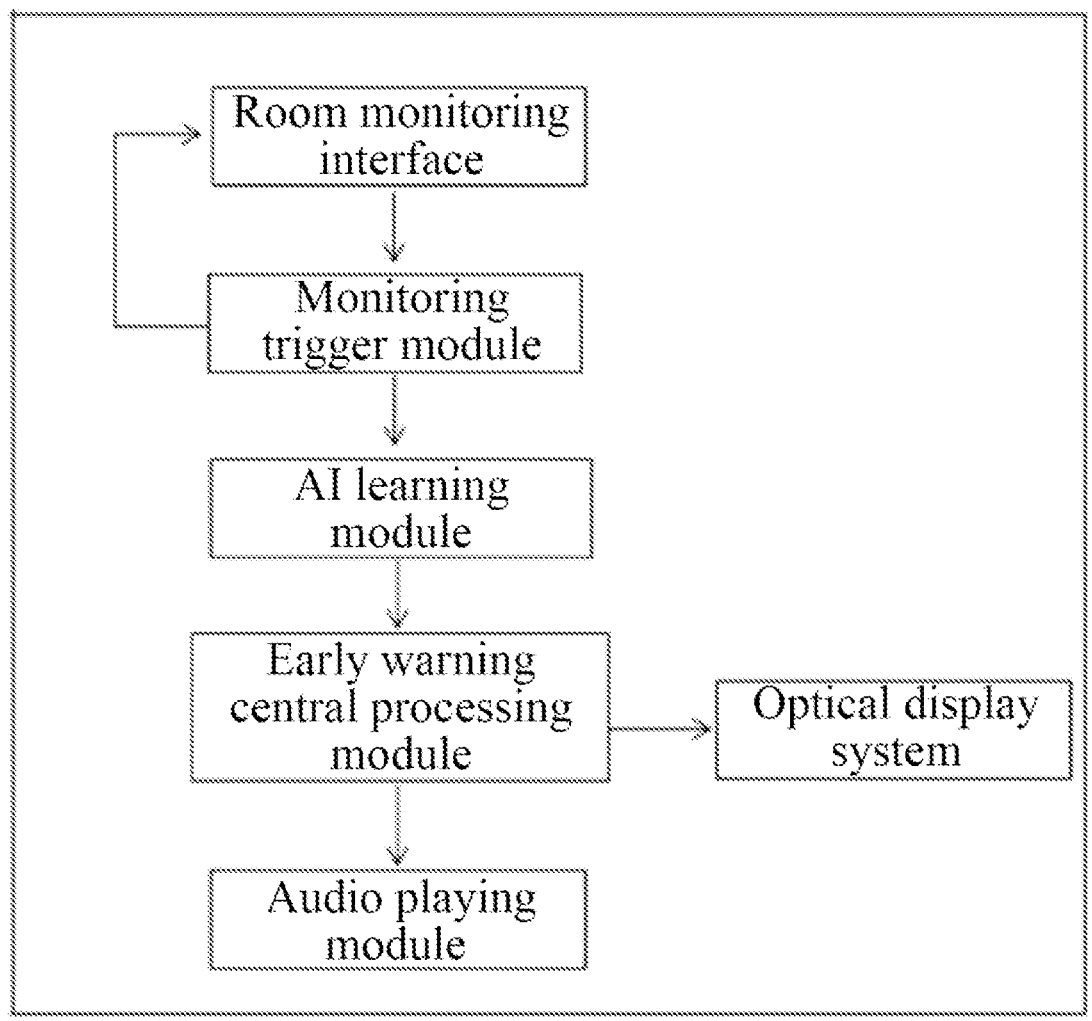
FIG. 4 is a work flow diagram of an early warning system in accordance with the present disclosure.

Please referring to FIG. 4, the early warning system 126 is configured to acquire the monitoring signal, perform safety analysis on the monitoring signal, and control the optical display system 122 to perform safety feedback. The early warning system comprises a room monitoring interface, a monitoring trigger module, an AI learning module, an early warning central processing module, and an audio playing module.

Further, the room monitoring interface may be connected to a monitor to acquire the monitoring signal, wherein the monitoring signal comprises monitoring data and monitoring videos. The trigger module is configured to store preset vital sign safety threshold values and to send the monitoring signal out when certain indicators of the monitoring content acquired by the room monitoring interface exceed the corresponding safety threshold values. The AI learning module is configured to store big data and receive the monitoring signal, analyze the monitoring signal according to the big data, and compare the operation-related information of the patient as well as the actual life condition of the patient with the big data to analyze the unsafe reasons, wherein the big data is a previously accumulated knowledge base for anesthesiologists. The early warning central processing module is configured to receive unsafe reason signals, form an interactive instruction, and control the optical display system to perform safety feedback which is specifically represented as red vital sign data display. The audio playing module is configured to receive the monitoring signal and the unsafe reasons, and play the audio which is specifically represented as corresponding alarm sounds, for example, the alarm sound is the alarm sound with high tone when the indicators much exceed the threshold values, and the alarm sound is the alarm sound with low tone when the indicators less exceed the threshold values. The audio is not limited in the present disclosure and can be set according to actual situations.

Figure 5:
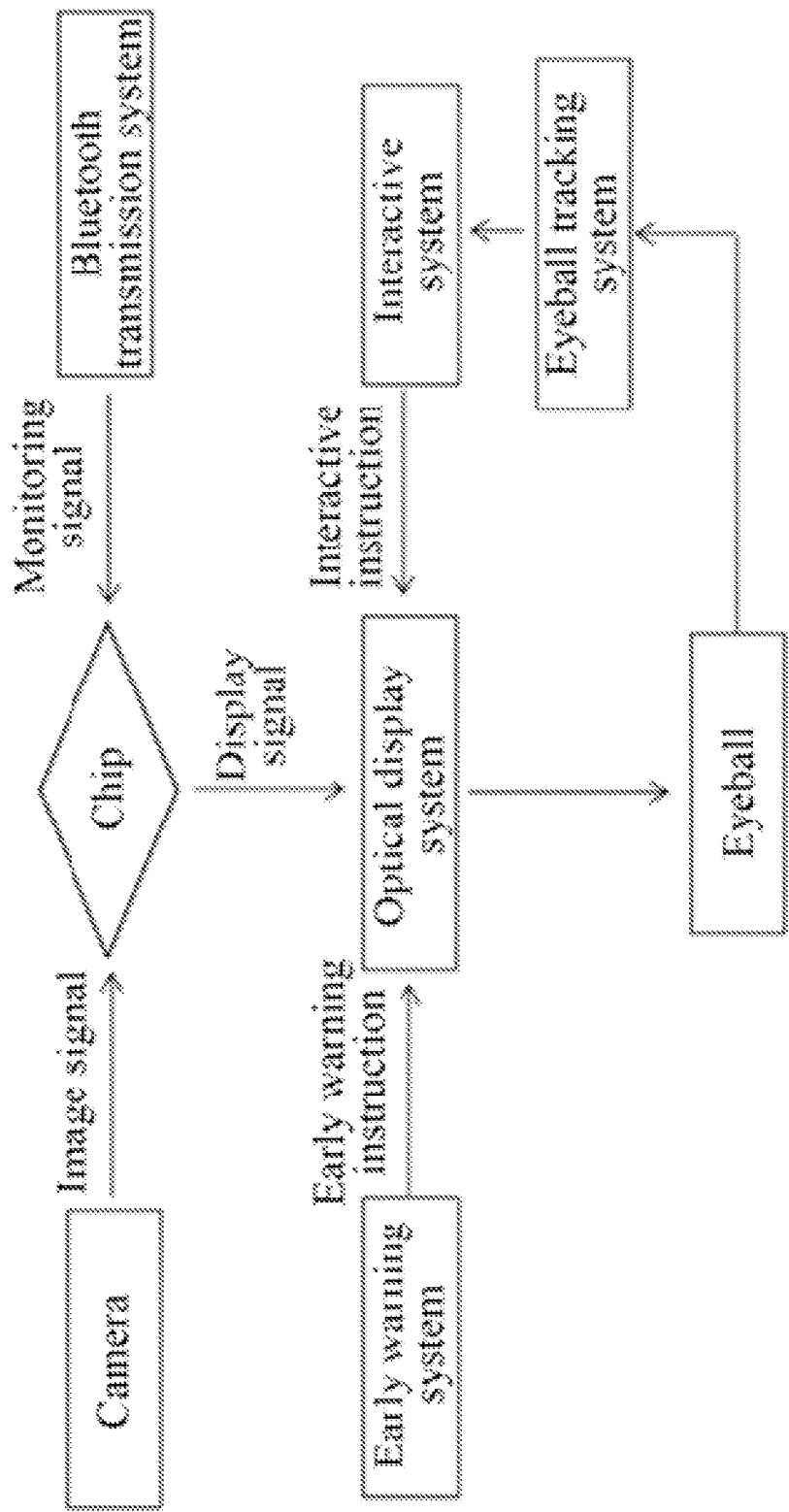
FIG. 5 is a control flow diagram of a pair of visualization monitoring glasses in accordance with the present disclosure.

Please referring to FIG. 5, the eyeball tracking system 128 is specifically represented as a microchip with a movement processing function, which is configured to capture a movement signal, a position signal and a pupil size signal of the eyeball, and analyze a fixation point of the eyeball through the deep learning module so as to form an interactive model. The eyeball tracking system comprises a high-speed vision sensor.

Further, the high-speed vision sensor is configured to capture the movement signal of the eyeball, the position signal of the eyeball moving around the optical waveguide lens and the pupil size signal, thus forming an eye tracking record. The deep learning module is configured to calculate the fixation point of the user according to the eye tracking record so as to form the interactive model. The interactive central processing system is configured to generate slightly different images according to the different movement positions of the eyeball, such that the images are always displayed in front of the eye, regardless of front view or side view.

It can be known from the above description that the visualization monitoring glasses provided by the disclosure is integrated with the AR glasses technology to achieve the monitorability of anesthesia, it is beneficial for the anesthesiologists to monitor the life data of surgical patients in real time and comprehensively master and accurately determine the patient condition when an emergency occurs, thus the anesthesia work efficiency is improved, and the life safety of the patient is further guaranteed. The glasses are provided with an alarm system which can detect the problems in time and find out the causes of the problems through the analysis of the computer, thus saving time for life saving. The glasses are light and portable, capable of achieving the observation of the surrounding real environment and the life data at the same time, and is convenient for the anesthesiologists to monitor life data without affecting their normal activities.

The foregoing are merely specific embodiments of the present disclosure, but are not intended to limit the scope of protection of the present disclosure. Any variation or replacement readily figured out by those skilled in the art within the technical scope disclosed in the present disclosure shall fall within the scope of protection of the present disclosure. Therefore, the scope of protection of the present disclosure shall be subject to the scope of protection of the claims.

We claim:

1. A pair of visualization monitoring glasses, comprising a monocular (10), wherein the monocular (10) comprises a lens (11) and a temple (12), and the temple (12) is internally provided with:
   a chip (123), configured to receive a monitoring signal, form a display signal according to the monitoring signal, and send the display signal out;
   an optical display system (122), configured to receive the display signal, and display the display content through the lens (11);
   an interactive system (125), configured to acquire a gesture action, and control the optical display system (122) to switch different display content according to the gesture action; and
   an early warning system (126), configured to acquire the monitoring signal, perform safety analysis according to the monitoring content, and control the optical display system (122) to perform safety feedback;
   wherein the interactive system (125) comprises:
   a gesture storage module, configured to store a preset gesture action and the types of display content corresponding to different gesture actions;
   a gesture acquisition module, configured to acquire a gesture action, and send the acquire gesture action out;
   a preprocessing module, configured to receive the acquired gesture action, and preprocess the acquired gesture action to form a digital signal;
   a deep learning module, configured to receive the digital signal, analyze the digital signal to establish a gesture action, and compare the established gesture action with the preset gesture action; and
   an interactive central processing module, configured to receive the established gesture action, form an interactive instruction according to the established gesture action, and send the interactive instruction to the optical display system (122) for interactive feedback.

2. The visualization monitoring glasses according to claim 1, wherein the temple (12) is further internally provided with:
   a camera (121), configured to acquire a viewed image, form an image signal according to the viewed image, and send the image signal out; and
   the chip (123), configured to receive the image signal, form a display signal according to the image signal, and send the display signal out.

3. The visualization monitoring glasses according to claim 1, further comprising a pair of binocular glasses (20), the monocular (10) is installed on a frame (21) on the one side of the binocular glasses (20) by a magnetic attraction device (30).

4. The visualization monitoring glasses according to claim 1, wherein the optical display system (122) comprises a display screen (1221) and an optical engine (1222); the display screen (1221) is configured to provide bright and clear display content according to the display signal, and the optical engine (1222) is configured to increase light energy utilization rate and improve light projection effect.

5. The visualization monitoring glasses according to claim 1, wherein the early warning system (126) comprises:
   a room monitoring interface, configured to acquire a monitoring signal;
   a monitoring trigger module, configured to store preset safety threshold values of vital sign data, and send an early warning signal outwards when the vital sign data acquired by the room monitoring interface exceed the safety threshold values;
   an AI learning module, configured to store big data and receive the early warning signal, and analyze the early warning signal according to the big data to determine unsafe reasons;
   an early warning central processing module, configured to receive the early warning signal and unsafe reasons, form an early warning instruction, and control the optical display system (122) to perform safety feedback; and
   an audio playing module, configured to receive the early warning signal and the unsafe reasons, and play an audio.

6. The visualization monitoring glasses according to claim 1, wherein the temple (12) is further internally provided with a Bluetooth transmission system (124), and the Bluetooth transmission system (124) is configured to transmit a monitoring signal in a monitor to the chip (123).

7. The visualization monitoring glasses according to claim 1, wherein the temple (12) is further internally provided with a power supply system (127); the temple (12) is provided with a USB interface (129), and the power supply system (127) is connected to a power source by the USB interface (129) so as to charge the temple (12).

8. The visualization monitoring glasses according to claim 4, wherein the temple (12) further comprises an eyeball tracking system, which is configured to capture a movement signal, a position signal and a pupil size signal of the eyeball, and analyze a fixation point of the eyeball through the deep learning module so as to form an interactive model.

9. The visualization monitoring glasses according to claim 8, wherein the interactive central processing module is configured to receive the interactive model, form an interactive instruction, and send the interactive instruction to the optical display system (122) for interactive feedback.

10. The visualization monitoring glasses according to claim 1, wherein the lens (11) is of a grating structure with continuous gradual change in depth, and sapphire glass is attached to the inside and outside of the lens.

* * * * *